H. D. JAMES.
SYSTEM OF ELECTRIC MOTOR CONTROL.
APPLICATION FILED NOV. 8, 1907.
924,786.
Patented June 15, 1909.
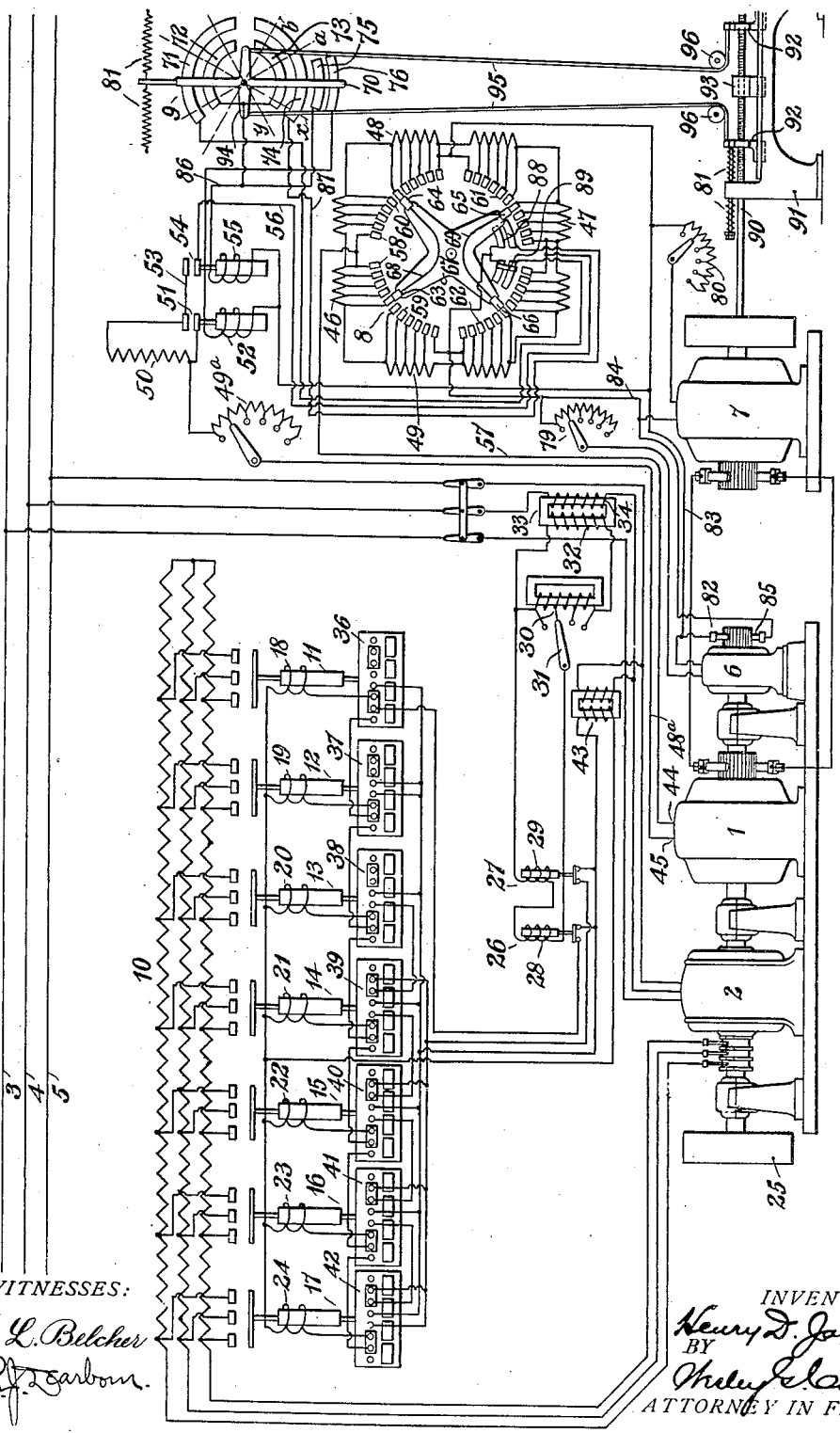
WITNESSES:
C. L. Belcher
R. J. Dearborn
INVENTOR.
Henry D. James
BY
Whiley L. Carr
ATTORNEY IN FACT.

UNITED STATES PATENT OFFICE.

HENRY D. JAMES, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

SYSTEM OF ELECTRIC-MOTOR CONTROL.

No. 924,786.  Specification of Letters Patent.  Patented June 15, 1909.

Application filed November 8, 1907. Serial No. 401,268.

*To all whom it may concern:*

Be it known that I, HENRY D. JAMES, a citizen of the United States, and a resident of Pittsburg, in the county of Allegheny and State of Pennsylvania, have invented a new and useful Improvement in Systems of Electric-Motor Control, of which the following is a specification.

My invention relates to systems of electric motor control and it has special reference to those systems in which the speed and direction of rotation of the motors are governed by adjusting the field excitation of the generators from which they are supplied with energy.

The object of my invention is to provide means whereby the operation of systems of the class above indicated may be improved and whereby the motors and other devices in the system may be protected from injuries resulting from abnormal conditions which usually obtain during the retardation of the motors.

When electric motors are employed to operate large variable loads they are frequently governed as to their speed and direction of rotation by adjusting the field strength and polarities of the generators supplying them with energy and further variations in speed are often effected by means of rheostats in the field magnet circuits of the motors. According to my present invention, I provide a limit switching device which is adapted to bring the motor to rest at predetermined points in its travel. In connection with this device I further provide automatic means for slowing down or retarding the motor by diminishing the strength of the generator field before its circuit is finally interrupted. In this way, the power supplied to the motor is diminished and finally cut off altogether and the generator is relieved from the shock which it would receive by a sudden rupture of its field magnet circuit.

The single figure of the accompanying drawing is a diagrammatic view of a control system constructed and arranged in accordance with my invention.

Referring to the drawing, the system illustrated comprises a direct current generator 1, an induction motor 2 which is supplied from the transmission circuit 3—4—5 and is mechanically connected to the generator, an exciter generator 6, a direct current motor 7 that is electrically connected to the generator 1, a field controller 8 for the generator and a limit switch 9 for the motor. The induction motor 2 is provided with a secondary resistance 10 which is controlled by a plurality of independently operated switches 11 to 17, inclusive, that are actuated by electromagnets 18 to 24, inclusive.

The rotatable members of the dynamo-electric machines 1 and 2 are mechanically connected together and a heavy fly-wheel 25 is driven by the motor 2 in order that energy may be absorbed and delivered by it as the load on the direct current generator 1 falls below or rises above predetermined limits.

A pair of relay switches 26 and 27, have operating magnet windings 28 and 29 which are supplied with current from an auto-transformer winding 30. The active length of this transformer winding 30 may be varied by means of a controller 31 for the purpose of adjusting the current values at which the switches 26 and 27 will be operated by their respective magnet windings. The auto-transformer winding 30 is connected to the secondary winding 32 of a series transformer 33, the primary winding 34 of which is included in the supply circuit of the motor 2. The switches 26 and 27 are so adjusted that the switches 11 to 17, inclusive, will be operated to insert resistance in, or remove it from, the secondary circuit of the motor 2 according as the load on the motor provided by the generator 1 exceeds or falls below predetermined limits, the speed of the motor being decreased when the generator load exceeds a predetermined value and the energy of the fly-wheel 25 being yielded or delivered for the purpose of supplementing the power supplied by the motor. When the generator load is light the motor speed is increased and energy is stored in the fly-wheel.

The control circuits for the switches 11 to 17, inclusive, are governed by relay switches 36 to 42, inclusive, that are operatively connected to the switches 11 to 17 and are supplied with energy from a transformer 43 which is connected across one phase of the motor supply circuit 3—4—5. Inasmuch as the operation of the switches 26 and 27 and the control of the resistance 10 are fully set forth in my copending applications, Serial Nos. 337,278 and 337,280, I deem it unnecessary to describe this portion of the system in detail herein.

The terminals 44 and 45 of the field magnet winding of the generator 1 are respectively connected to two opposite points of a Wheatstone bridge, which is formed by resistance sections 46, 47, 48, and 49, by means of a conductor 57, and a conductor 48ª, a rheostat 49ª, a resistance 50 (which is normally shunted by switch 51 having an operating magnet 52), a conductor 53, a switch 54 (having a magnet winding 55) and a conductor 56.

The resistances 46, 47, 48, and 49 are subdivided by taps which are connected to a plurality of stationary contact terminals 58 of the controller 8, the contact terminals being arranged in four groups 59, 60, 61, and 62 with which brushes 63, 64, 65, and 66, mounted on the extremities of a four-armed movable brush holder 67, are adapted to engage. The brushes 63 and 64 are connected by means of a conductor 68 and the brushes 65 and 66 are connected by a conductor 69.

The direction and value of the field excitation for the generator 1 may be adjusted by rotating the movable brushholder in a clockwise or counter-clockwise direction. The controller here shown and described forms the subject-matter of another co-pending application, Serial No. 337,279, filed October 3, 1906, and consequently, its structure and mode of operation will not be described in detail herein.

The limit switching device 9 comprises a movable contact arm 70 and a plurality of contact ring segments 71 to 76, inclusive. The contact arm 70 is adapted to occupy positions $a$, $b$, $x$, and $y$, positions $a$ and $x$ of which are slow speed positions through which the controller passes when it is actuated by the motor at an intermediate point in, or at either extremity of its travel. This movement of the contact arm may be effected by any convenient means, such as that shown and described in Patent 862,192, granted August 6, 1907 to the Westinghouse Electric & Manufacturing Company as assignee of William Paris, or as illustrated in the drawing, by a screw-threaded shaft 90 driven by the motor 7, a supporting frame 91 therefor, dogs 92 adjustably mounted on the frame and a traveling nut 93 mounted on the screw-threaded shaft. The dogs 92 are adapted to operate the contact arm 70, being connected to this part by an arm 94 and cords or other flexible conductors 95 which pass under pulleys or sleeves 96. The dogs 92 are actuated by the nut 93 when predetermined limits in the motor operation have been reached in either direction.

The exciter generator 6 is connected to the remaining quadrature points in the Wheatstone bridge, composed of resistances 46, 47, 48, and 49, and a rheostat 79 is inserted in the field magnet circuit of the exciter. The field magnet winding of the generator 1 is thus supplied with energy from the exciter and although the principal regulation of the generator field is effected by the controller 8, an adjustment of the motor speed characteristic may be effected by a rheostat 80 which is connected directly in the field magnet circuit of the motor, this circuit being also supplied with energy from the exciter 6.

The circuit connections for the generator field magnet are as follows: Assuming that contact arm 70 is held in position $b$ in opposition to the centering spring 81, the limit switch having been moved to this position when the motor 7 reached one limit of, or a predetermined point in, its operation; circuit connections may now be established for rotating the motor in the reverse direction by rotating the movable brush holder 67 of the controller 8 in a clockwise direction, whereupon a circuit is established from an armature terminal 82 of the exciter generator 6 through conductor 83, a portion of the resistance section 48, connector 68, a portion of resistance 46 and conductor 57 to field magnet terminal 44 of the generator 1. From the opposite field magnet terminal 45, a circuit is completed through conductor 48ª, rheostat 49ª, resistance 50, conductor 53, switch 54, conductor 56, a portion of resistance 47, connector 69, a portion of resistance 49 and conductor 84 to armature terminal 85 of the exciter 6. The amount of resistance included in the field magnet circuit so established is dependent upon the extent of the movement which is imparted to the brush holder 67.

The control circuit for the magnet winding of the switch 54 is provided from conductor 83 and is completed through a magnet winding 55 of this switch, conductor 86 and contact members 73 and 74 (which are bridged by contact member 70), conductor 87, contact members 88 (that are bridged by contact member 89), and conductor 84 to the opposite terminal of the exciter circuit. If the limiting switch is now moved to its mid position, a branch circuit is completed through the magnet winding 52 of the switch 51. The closure of this switch short-circuits the resistance 50 and strengthens the generator field magnet, thereby increasing the speed of the motor. When the motor has reached another predetermined point in, or the opposite limit of, its travel, the limiting switch 9 is automatically moved from its mid position to the position $y$ through the position $x$. In the position $x$ the contact arm 70 becomes disengaged from contact members 75 and 76 so that the magnet winding 52 is deënergized and the resistance 50 is inserted in the field magnet circuit of the generator. In position $y$ the switch 55 is open so that the field magnet circuit is completely interrupted.

Considerable advantage is realized by utilizing the automatic features of my present invention since the variations in the field magnet circuit of the generator are made more gradual by the inserting and the cutting out of the resistance 50 which is independent of the ordinary field controlling resistance 46, 47, 48, and 49.

While the operating mechanism for the limit switch is arranged, as shown, to bring the motor to rest at two opposite limits of its travel, it will be readily understood that intermediate points in the motor operation may be provided with similar automatic means for stopping the motor in order that the requirements of automatic elevators and similar devices may be met.

It is evident that various modifications may be effected in the arrangement and circuit connections of my system without departing from the spirit of my invention and I desire that only such limitations shall be imposed as are indicated in the appended claims.

I claim as my invention:

1. In a control system, the combination with a motor, a generator electrically connected thereto and means for regulating the generator field to control the speed and direction of rotation of the motor, of a normally short-circuited auxiliary resistance in the generator field circuit, and automatic means for inserting said resistance to weaken the generator field at predetermined limits in the motor operation.

2. In a control system, the combination with a motor, a generator electrically connected thereto and means for regulating the field of the generator to control the speed of the motor, of automatic means for weakening the generator field at predetermined points in the motor operation.

3. In a control system, the combination with a direct current generator, a driving motor therefor, a direct current electric motor electrically connected to the generator and means for regulating the field of the generator to control the speed of the motor, of an auxiliary resistance in the generator field magnet circuit, a short-circuiting switch therefor and means for automatically opening the switch at predetermined points in the operation of the direct current motor in either direction.

4. In a control system, the combination with a direct current generator, a driving motor therefor, and means for automatically regulating the speed of the driving motor, of a direct current motor electrically connected to the generator, a field regulating switch for the generator, a limit switch, an auxiliary resistance in the field magnet circuit of the generator, and an independently operated short circuiting switch for the resistance, said switch being energized only when the limit switch occupies its mid position.

5. In a control system, the combination with a pair of dynamo-electric machines having a permanent electrical connection between their armatures, and a field governor for varying the field excitation of one of the machines from zero to maximum in either direction, of a normally short-circuited auxiliary resistance connected in series with said governor, and automatic means for inserting said auxiliary resistance at predetermined limits in the operation of the other machine.

6. In a control system, the combination with a generator, a motor electrically connected thereto, and means for varying the field excitation of the generator from zero to maximum in either direction to govern the speed and direction of rotation of the motor, of automatic means independent of said varying means for weakening the field of the generator at predetermined limits in the motor operation.

In testimony whereof, I have hereunto subscribed my name this 30th day of Oct., 1907.

HENRY D. JAMES.

Witnesses:
R. W. COPELAND,
BIRNEY HINES.